(12) United States Patent
Laflamme et al.

(10) Patent No.: US 6,717,050 B2
(45) Date of Patent: Apr. 6, 2004

(54) MOUNTING ASSEMBLY FOR ELECTRONIC MODULE

(75) Inventors: Benoit Laflamme, Quebec (CA); Joanne Begin, Quebec (CA); Philippe Lessard, St-Emile (CA)

(73) Assignee: 9090-3493 Quebec, Inc., Quebec (CA)

( * ) Notice: Subject to any disclaimer, the term of this patent is extended or adjusted under 35 U.S.C. 154(b) by 0 days.

(21) Appl. No.: 09/841,905

(22) Filed: Apr. 25, 2001

(65) Prior Publication Data

US 2002/0157844 A1 Oct. 31, 2002

(51) Int. Cl.[7] .................................................. H02G 3/08
(52) U.S. Cl. ............................. 174/50; 174/53; 174/58; 220/3.2; 220/3.3
(58) Field of Search ............................. 174/50, 48, 53, 174/54, 57, 17, 58; 220/3.2, 3.3, 3.4, 3.5, 3.6, 3.7, 3.9, 4.02; 248/27.1, 343, 906

(56) References Cited

U.S. PATENT DOCUMENTS

| | | | | |
|---|---|---|---|---|
| 3,040,338 A | * | 6/1962 | Zeleny et al. ............... 248/27.1 |
| 3,090,587 A | * | 5/1963 | Peterson ..................... 248/27.1 |
| 4,000,874 A | * | 1/1977 | Finley et al. .................. 174/58 |
| 4,066,838 A | * | 1/1978 | Fujita et al. ................... 174/48 |
| 4,297,525 A | * | 10/1981 | Bowden, Jr. .................. 174/58 |
| 4,332,330 A | * | 6/1982 | Lockwood ................... 220/3.4 |
| 5,221,814 A | * | 6/1993 | Colbaugh et al. ............. 174/58 |
| 5,374,103 A | * | 12/1994 | Stange et al. ............... 248/27.1 |
| 5,434,359 A | * | 7/1995 | Schnell ........................ 220/3.6 |
| 5,603,424 A | * | 2/1997 | Bordwell et al. ............. 220/3.5 |
| 5,661,264 A | * | 8/1997 | Reiker .......................... 174/50 |
| 5,931,432 A | * | 8/1999 | Herold et al. ................ 248/343 |
| 6,093,890 A | * | 7/2000 | Gretz ........................... 174/50 |
| 6,102,360 A | * | 8/2000 | Clegg et al. .................. 220/3.6 |
| 6,170,685 B1 | * | 1/2001 | Currier ........................ 220/3.3 |
| 6,241,368 B1 | * | 6/2001 | Depino ........................ 362/147 |

* cited by examiner

*Primary Examiner*—Dean A. Reichard
*Assistant Examiner*—Angel R Estrada
(74) *Attorney, Agent, or Firm*—John R. Ross; John R. Ross, III (57) ABSTRACT

A mounting assembly for mounting an electronic module to a control panel. A flange is attached to an electronic module body section. At least one bracket is rotatably attached to the flange. The rotation of the at least one bracket is controllable from the front side of the control panel. When the at least one bracket is tightened a compressive force holding the electronic module body section in place is imparted between the flange, the control panel wall and the at least one bracket. In a preferred embodiment the at least one bracket is two brackets. In the preferred embodiment the two brackets are further controllable from the back side of the control panel. Also, in the preferred embodiment, two bolts are inserted through the flange. Two locking nuts are attached to the two bolts. The electronic module body section has two cavities for housing the two brackets prior to tightening them against the control panel wall. Also, in the preferred embodiment, the flange is removable and the electronic module body section can be bolted to the back of a control panel utilizing bolts rigidly attached to the back of the control panel.

23 Claims, 8 Drawing Sheets

MOUNTING ASSEMBLY FOR ELECTRONIC MODULE

The present invention relates to mounting assemblies, and in particular to mounting assemblies for mounting devices to control panels.

BACKGROUND OF THE INVENTION

Methods used to install electronic control modules into control panels are known and vary depending on whether the electronic module is to be inserted from the front of the control panel or the back.

Front Insertion

Electronic modules that are inserted from the front of the control panel typically have a mounting assembly that has a flange. The flange permits the body portion of the electronic module to be inserted into an opening in the control panel, but the flange is larger than the opening so that it prevents the entire electronic module from slipping through the opening. Electronic modules that have a flange and are installed from the front of the control panel typically are secured from the back. The electronic module is usually held in place with brackets installed from the back. The brackets are usually puller-type fixation brackets or collars that clip and slide over the module and compress the module against the control panel. A problem with securing the front inserted electronic module from the back is that there is a significant amount of time and difficulty added to the process of installing, removing or servicing the electronic module.

A method used to avoid the step of securing the front inserted electronic module from the back is achieved by screwing the front flange of the electronic module directly to the wall of the control panel. The flange, screwed to the wall, holds the electronic module in place against the control panel. However, a problem associated with screwing the flange to the control panel is that in order to achieve equal compression of the flange gasket, several screws are needed around the perimeter of the flange. Also, screw holes in the flange have to match exactly with the screw holes surrounding the perimeter of the opening in the control panel.

Back Insertion

When it is desirable to have a smooth front surface of the control panel, the electronic module is mounted from the back. Holes are cut into the control panel to allow access to the module and bolts are rigidly attached to the back side of the control panel wall. The electronic module is slid over the bolts and is bolted tight against the control panel.

Because the known methods of mounting electronic modules to a control panel differ depending on whether the electronic module is to be inserted from the front or the back, installers, manufacturers and service repair technicians need to keep different types of mounting assemblies in stock.

What is needed is a better mounting assembly for mounting an electronic module to a control panel.

SUMMARY OF THE INVENTION

The present invention provides a mounting assembly for mounting an electronic module to a control panel. A flange is attached to an electronic module body section. At least one bracket is rotatably attached to the flange. The rotation of the at least one bracket is controllable from the front side of the control panel. When the at least one bracket is tightened a compressive force holding the electronic module body section in place is imparted between the flange, the control panel wall and the at least one bracket. In a preferred embodiment the at least one bracket is two brackets. In the preferred embodiment the two brackets are further controllable from the back side of the control panel. Also, in the preferred embodiment, two bolts are inserted through the flange. Two locking nuts are attached to the two bolts. The electronic module body section has two cavities for housing the two brackets prior to tightening them against the control panel wall. Also, in the preferred embodiment, the flange is removable and the electronic module body section can be bolted to the back of a control panel utilizing bolts rigidly attached to the back of the control panel.

DETAILED DESCRIPTION OF THE PREFERRED EMBODIMENTS

Figure 1:
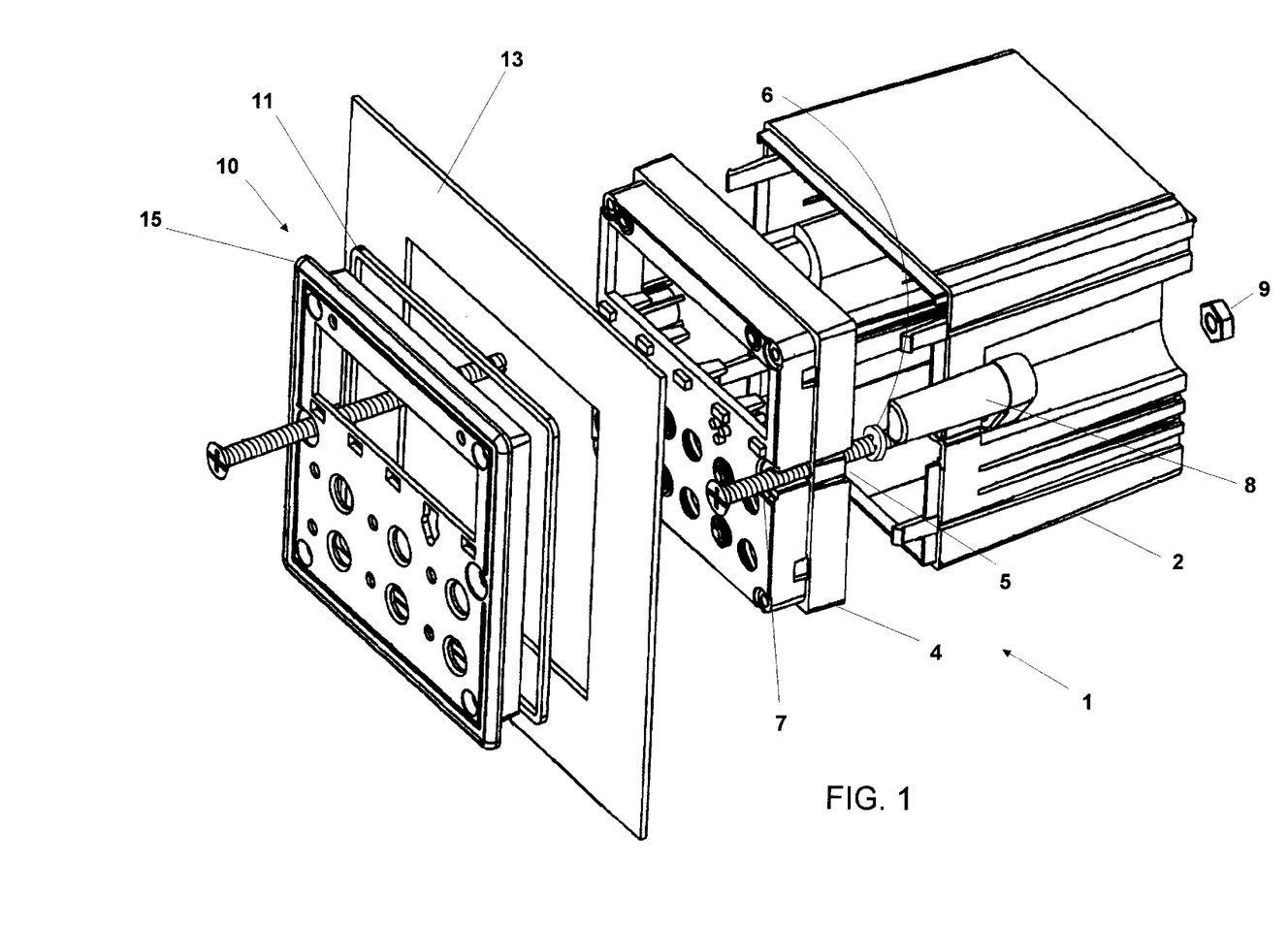
FIG. 1 shows an exploded perspective view of a preferred embodiment of the present invention.

Overview of Some of the Components of a Preferred Embodiment FIG. 1 shows an exploded perspective view of a preferred embodiment of the present invention. Body 2 of electronic module 1 is preferably snap fitted to front section 4. In the preferred embodiment, body 2 houses electrical components (not shown) of electronic module 1. Flanged section 10 having flange 15 is preferably screwed onto front section 4. Gasket 11 is between flanged section 10 and control panel wall 13. In the preferred embodiment, electronic module 1 is an electronic control module for an oven and is attached to the control panel of the oven.

Installation from the Front of the Preferred Embodiment

Figure 2:
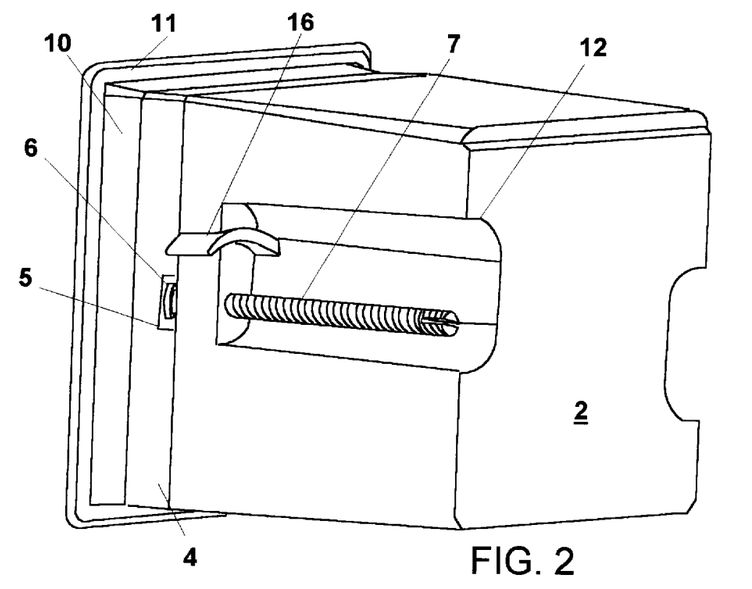
FIGS. 2–12 show perspective views of a preferred embodiment of the present invention.
Figure 3:
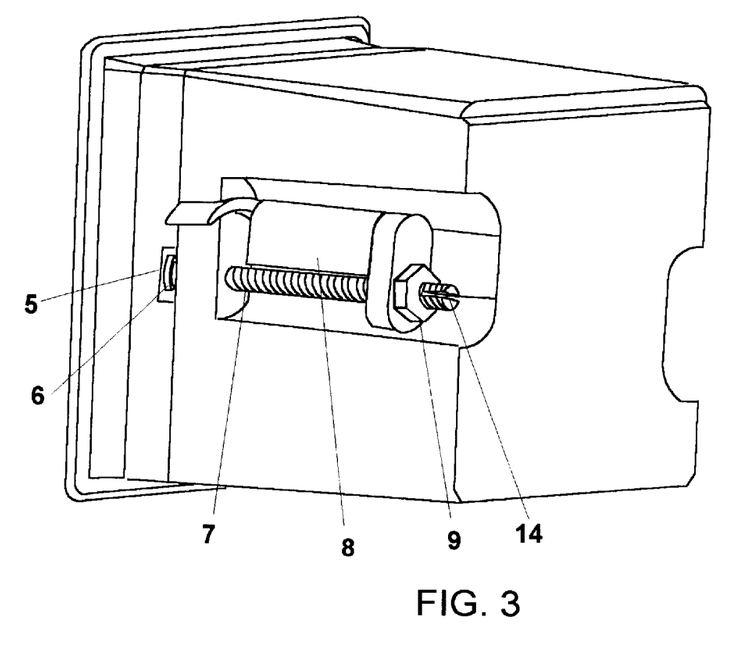
Figure 9:
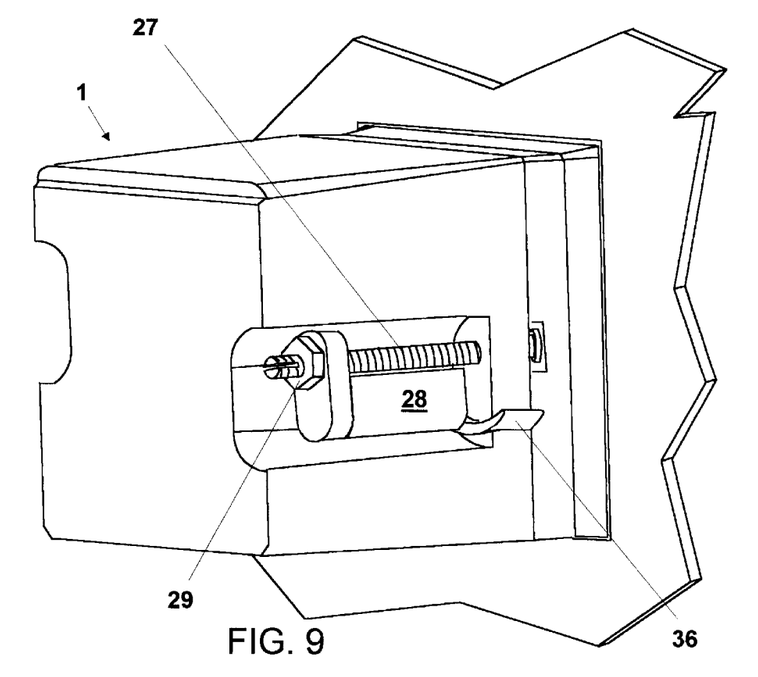

FIGS. 2–12 show perspective views of a preferred embodiment of the present invention. FIG. 2 shows electronic module 1 prior to attaching bracket 8 and lock nut 9 (FIG. 1). Electronic module 1 has half-elliptical cutout sections 12 on opposite sides to permit the installation of two L-shaped brackets 8. As shown in FIG. 3, first bracket 8 and then lock nut 9 are threaded onto bolt 7. Note that lock nut 9 is threaded onto bolt 7 so that its end position is just below slot 14. In a similar fashion, on the opposite side of electronic module 1, bracket 28 and lock nut 29 are threaded onto bolt 27, as shown in FIG. 9. FIG. 2 also shows ramp 16 rigidly attached to body 2 inside half-elliptical cutout section 12. Front section 4 has cutout section 5 to accommodate nylon retention washer 6. Cutout section 5 is large enough so that it permits the easy rotation of nylon retention washer 6 when bolt 7 is being turned. Nylon retention washer 6 tightly grasps bolt 7 and functions to help prevent slippage of bolt 7 in electronic module 1.

Figure 4:
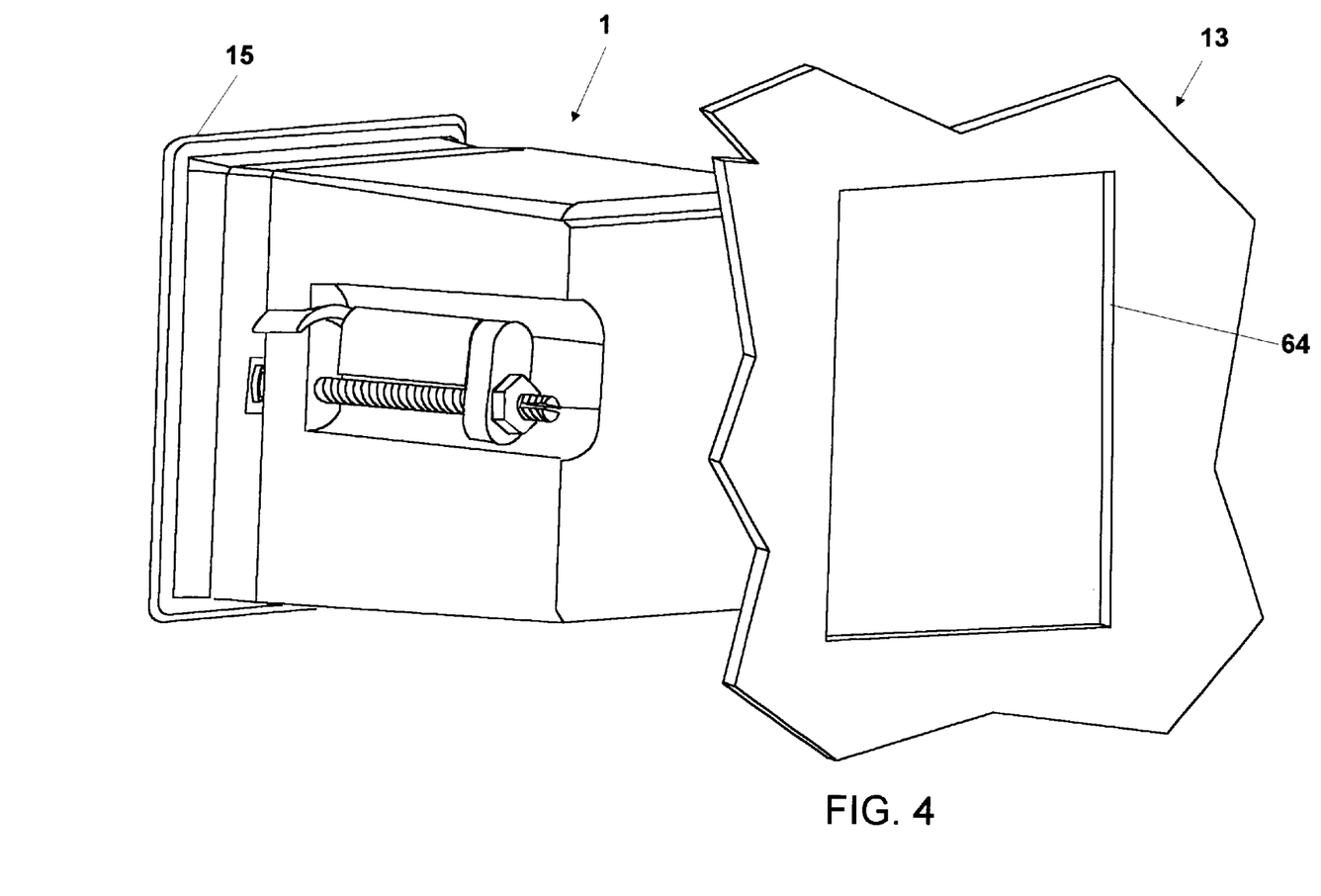
Figure 5:
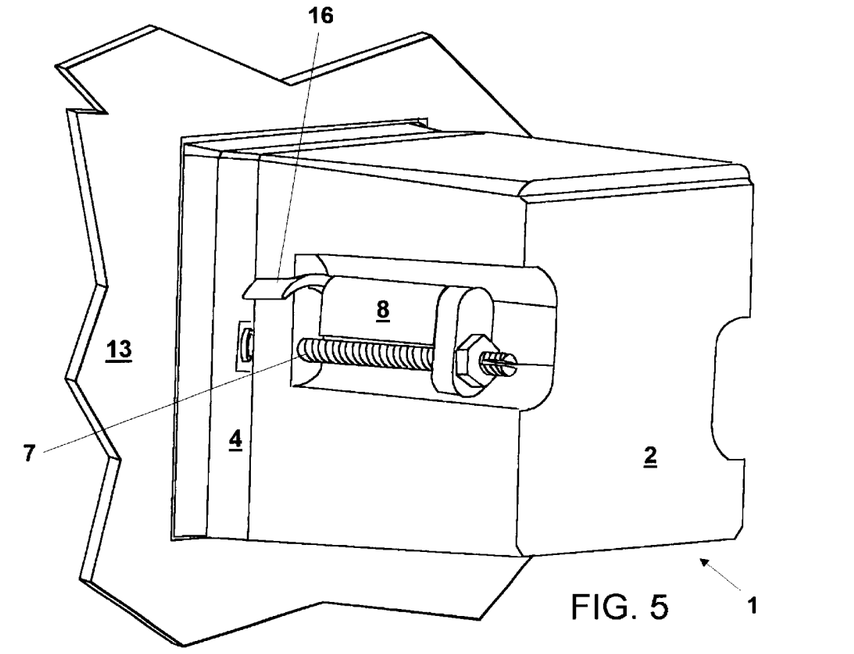

Electronic module 1 is then aligned from the front of control panel wall 13 so that it is in front of opening 64, as shown in FIG. 4. Electronic module 1 is then slid through opening 64, as shown in FIG. 5. Opening 64 is large enough so that body 2 and front section 4 can easily be slid through it, yet small enough so that flange 15 (FIG. 4) is stopped by control panel wall 13.

Figure 6:
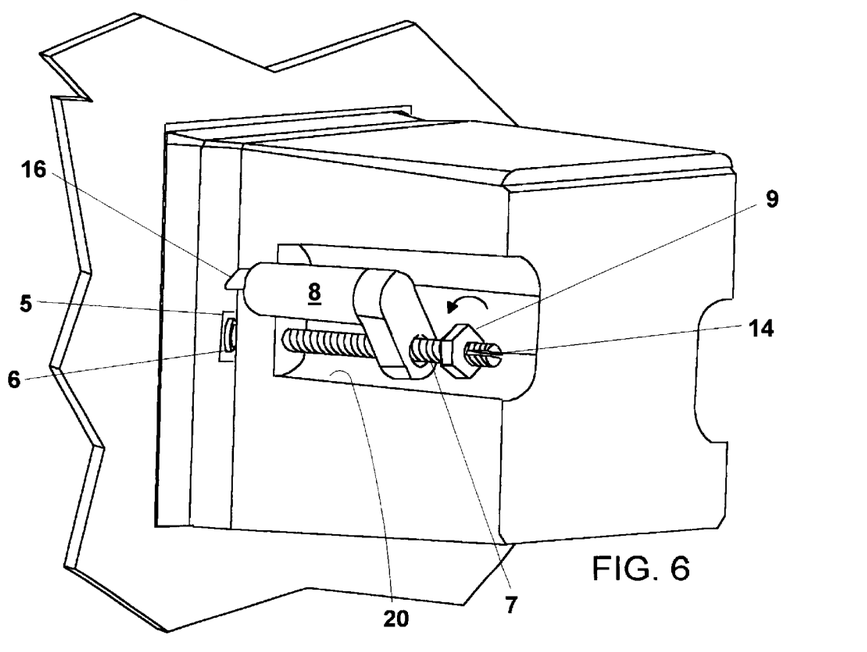

Bolt 7 is then turned in the direction indicated by the arrow in FIG. 6. The installer of electronic module 1, may either turn bolt 7 from the front by using a Phillips head screwdriver (FIG. 1) or he may turn bolt 7 from the back by using a flat head screwdriver in slot 14 (FIG. 6). The turning of bolt 7 causes threaded bracket 8 to move closer to the back of control panel wall 13, as shown in FIG. 6. Lock nut 9, tightly locked against bolt 7, stays in position just below slot 14. Likewise, retention washer 6, held tight against bolt 7, stays in position in cutout section 5. As bracket 8 is moved closer to the back of control panel wall 13, the bottom of bracket 8 is pressed against ramp 16 so that bracket 8 is directed outside of the cavity formed by half-elliptical cutout section 12 (FIG. 2). Bottom section 20 of half-elliptical cutout section 12 prevents bracket 8 from further rotation in the direction indicated by the arrow in FIG. 6.

Figure 7:
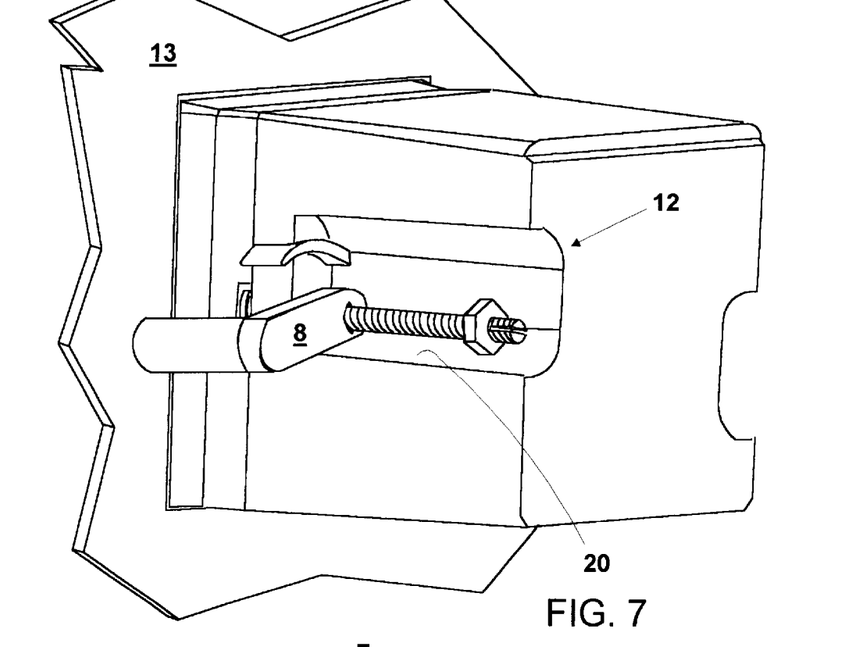

As bolt 7 is continually turned in the direction indicated by the arrow in FIG. 6, bracket 8 will eventually come to the position as shown in FIG. 7. In FIG. 7, bracket 8 is pressed firmly against the back side of control panel wall 13.

Tightening the Other Bracket

Figure 10:
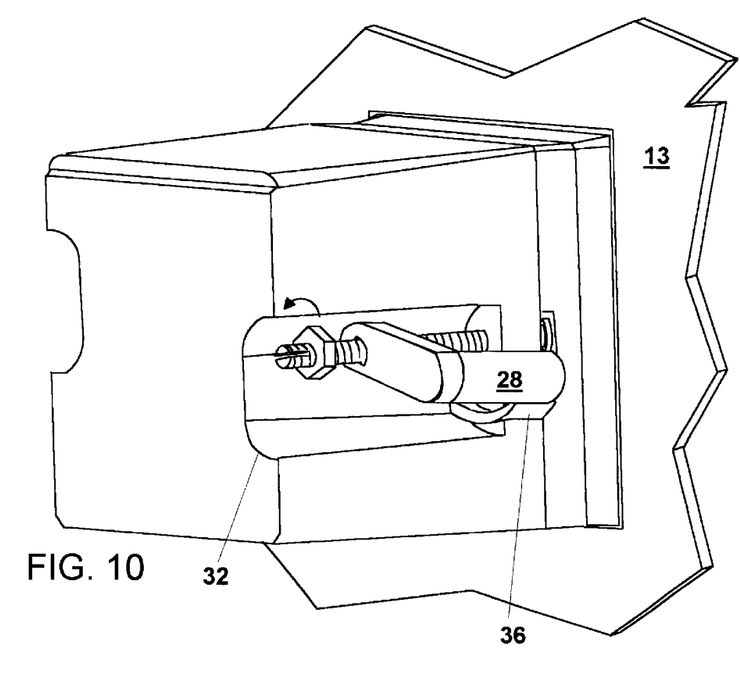
Figure 11:
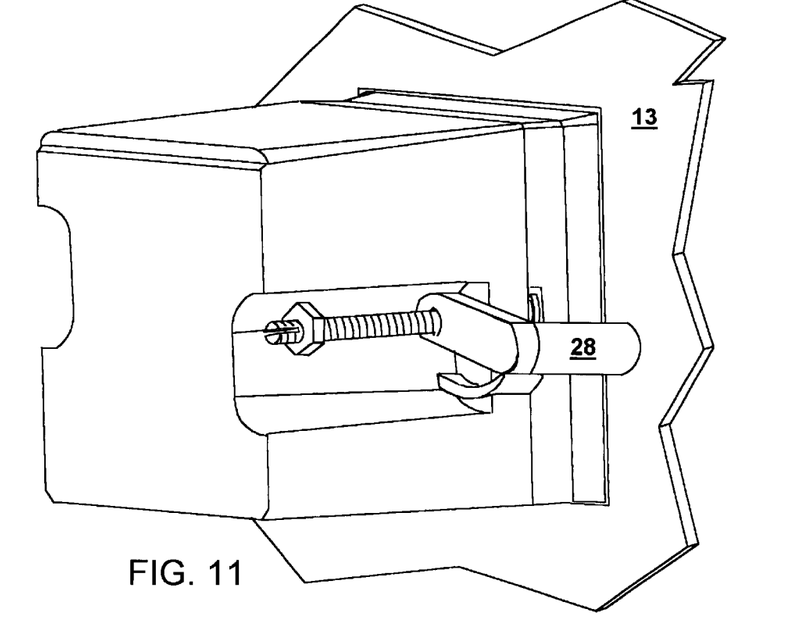

In a fashion similar to that described above regarding bracket 8, as bolt 27 is rotated in the direction indicated by the arrow in FIG. 10, bracket 28 moves towards the back side of control panel 13. As bracket 28 is moved towards the back side of control panel wall 13, bracket 28 is rotated upward by ramp 36 so that it is outside of the cavity formed by half-elliptical cutout section 32. As bolt 27 is continually turned in the direction indicated by the arrow in FIG. 10, bracket 28 will eventually come to the position as shown in FIG. 11. In FIG. 11, bracket 28 is pressed firmly against the back side of control panel wall 13.

Removing the Module from the Control Panel

Figure 8:
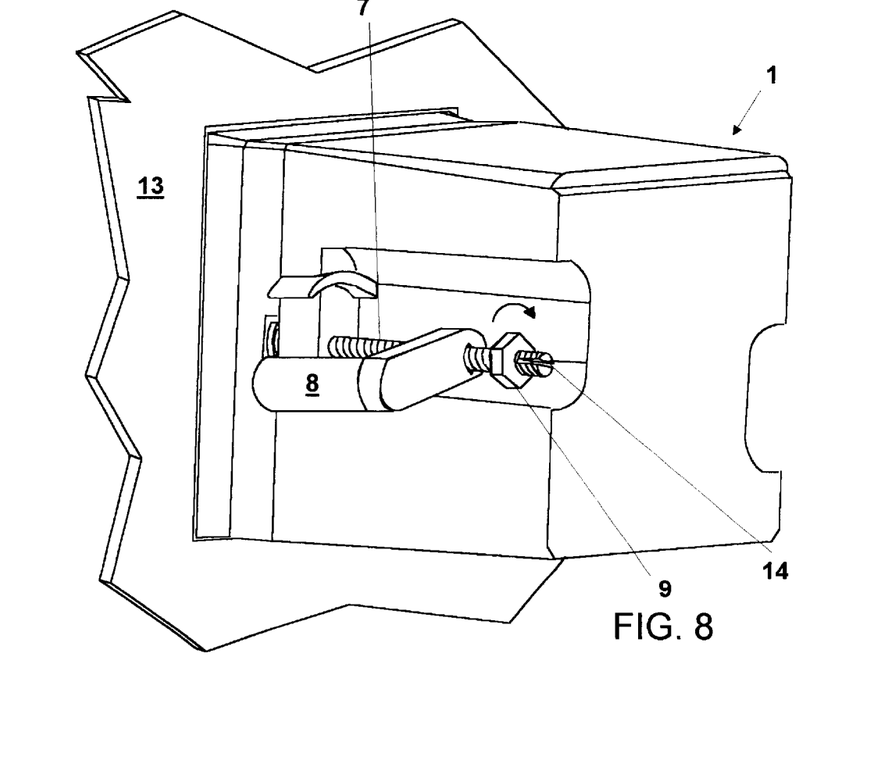

To remove electronic module 1 from the control panel, bolt 7 is turned in the direction indicated by the arrow in FIG. 8. The individual removing electronic module 1, may either turn bolt 7 from the front by using a Phillips head screwdriver (FIG. 1) or he may turn bolt 7 from the back by using a flat head screwdriver in slot 14 (FIG. 8). This causes bracket 8 to move in a direction away from the back side of control panel wall 13. Eventually, bracket 8 will come into contact with locking nut 9. The friction between locking nut 9 and bracket 8 will cause bracket 8 to rotate in the direction indicated by the arrow in FIG. 8, thereby moving bracket 8 into the cavity formed by half-elliptical cutout section 12 so that bracket 8 is in the position shown in FIG. 5.

Figure 12:
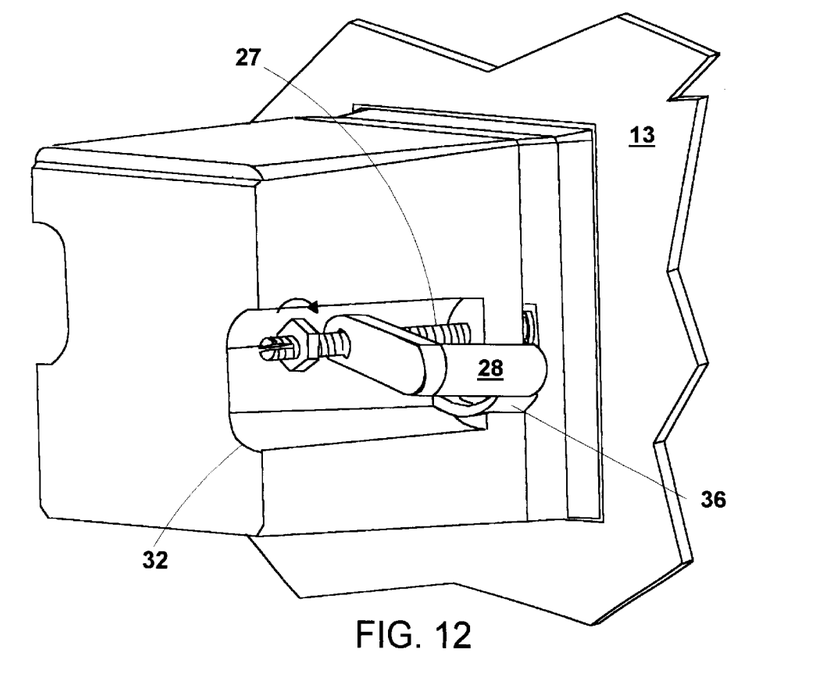

In a similar fashion, bracket 28 can be loosened from the position shown in FIG. 11. Turning bolt 27 in the direction shown in FIG. 12 causes bracket 28 to move away from the back side of control panel wall 13. When bracket 28 clears ramp 36, it will fall into the cavity formed by half-elliptical cutout section 32. When bracket 28 comes into contact with locking nut 29, it will stop moving backwards and electronic module 1 will be in the position shown in FIG. 9. When bracket 28 is in the position shown in FIG. 9 and bracket 8 is in the position shown in FIG. 5, electronic module 1 can be easily pulled away from control panel wall 13 by grabbing flange 15 from the front and pulling.

Installation from the Back

Figure 13:
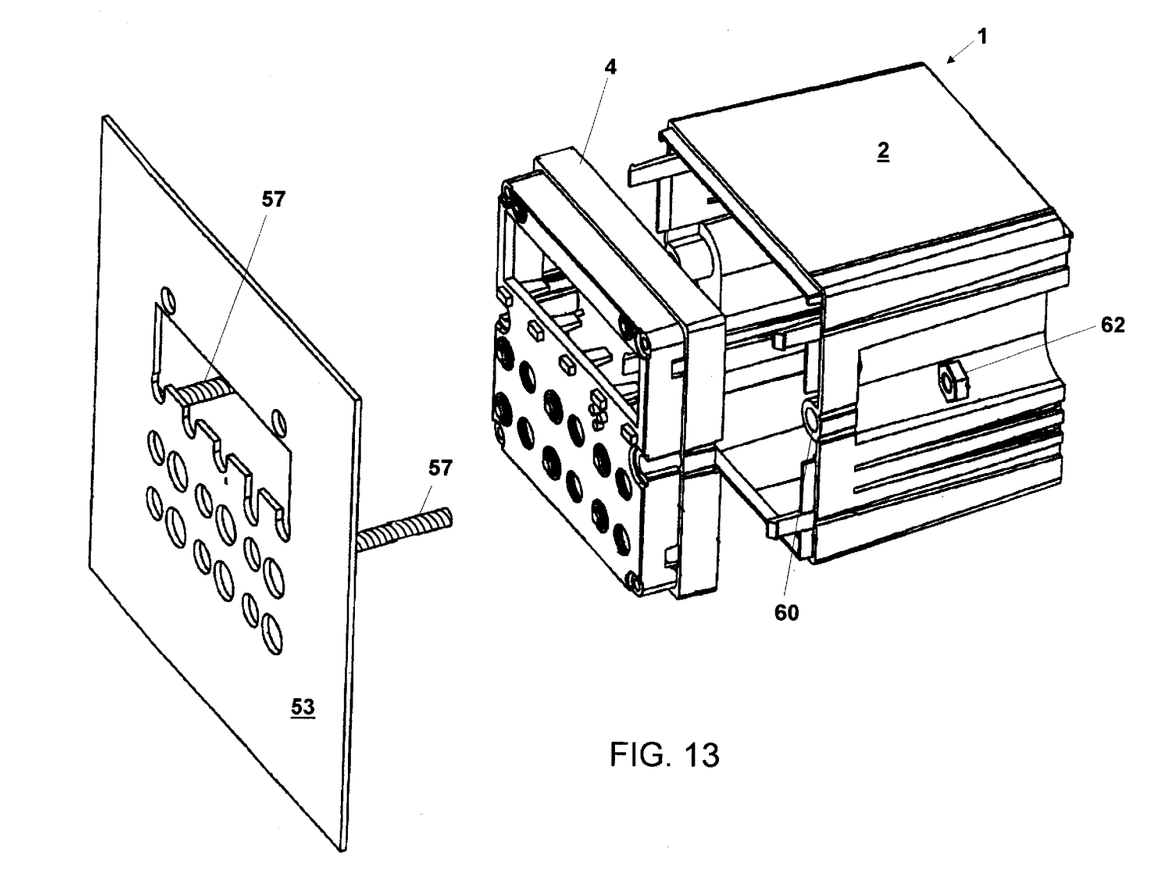
FIG. 13 shows an exploded perspective view of a preferred embodiment of the present invention configured so as to be mountable to the back side of a control panel.

A preferred embodiment of the present invention is modifiable so that it can be used with control panels that are designed to accommodate electronic modules that mount from the back. FIG. 13 shows control panel wall 53 having two threaded bolts 57 rigidly attached to its back side. Also shown is electronic module 1 with body 2 and front portion 4. However, note that flange section 10, gasket 11, retention washer 6 and brackets 8 and 28 have been removed from electronic module 1. To install electronic module 1 from the back side, the installer needs electronic module 1 over bolts 57 through holes 60 and then tighten electronic module against control panel wall 53 by threading nuts 62 over bolts 57 until tight.

Although the above-preferred embodiments have been described with specificity, persons skilled in this art will recognize that many changes to the specific embodiments disclosed above could be made without departing from the spirit of the invention. For example, although it was stated that in the preferred embodiment, electronic module 1 is an electronic control module for an oven control panel, electronic module 1 could easily be modified to contain electrical components for controlling other types of devices as well. For example, electronic module 1 could house components for controlling a spa and could be attached to a spa's control panel. Or, electronic module 1 could house components for controlling an automobile's stereo system and could be attached to the automobile's control panel near its dashboard. Therefore, the attached claims and their legal equivalents should determine the scope of the invention.

We claim:

1. A mounting assembly for mounting an electronic module to a control panel, wherein said control panel defines a front side and a back side and a control panel wall, comprising:
    A. an electronic module body section comprising a bracket housing cavity,
    B. a flange attached to said electronic module body section, and
    C. at least one bracket rotatably attached to said flange, wherein the rotation of said at least one bracket is controllable from both said front side of said control panel and from said back side of said control panel, wherein when said at least one bracket is tightened a compressive force holding said electronic module body section in place is imparted between said flange, said control panel wall and said at least one bracket, wherein said at least one bracket is housed in said bracket housing cavity prior to said tightening of said at least one bracket.

2. The mounting assembly as in claim 1, wherein said at least one bracket is two brackets and further comprising two bolts inserted through said flange wherein said two brackets are threaded onto said two bolts.

3. The mounting assembly as in claim 2, further comprising two locking nuts each threaded onto the end of each of said two bolts.

4. The mounting assembly as in claim 1, wherein said flange is removably attached to said electronic module body section.

5. The mounting assembly as in claim 1, wherein said electronic module is for controlling an oven.

6. The mounting assembly as in claim 1, wherein said electronic module is for controlling a spa.

7. The mounting assembly as in claim 1, wherein said electronic module is for controlling a pool heater.

8. A mounting assembly for mounting an electronic module to a control panel, wherein said control panel defines a front side and a back side and a control panel wall, comprising:
    A. an electronic module body section means comprising a bracket housing cavity means,
    B. a flange means attached to said electronic module body section means, and C. at least one bracket means rotatably attached to said flange means, wherein the rotation of said at least one bracket means is controllable from both said front side of said control panel and from said back side of said control panel, wherein when said at least one bracket means is tightened a compressive force holding said electronic module body section means in place is imparted between said flange means, said control panel wall and said at least one bracket means, wherein said at least one bracket means is housed in said bracket housing cavity means prior to said tightening of said at least one bracket means.

9. The mounting assembly as in claim 8, wherein said at least one bracket means is two brackets and further comprising two bolt means inserted through said flange means wherein said two brackets are threaded onto said two bolt means.

10. The mounting assembly as in claim 9, further comprising two locking nut means each threaded onto the end of each of said two bolt means.

11. The mounting assembly as in claim 8, wherein said flange means is removably attached to said electronic module body section means.

12. The mounting assembly as in claim 8, wherein said electronic module is for controlling an oven.

13. The mounting assembly as in claim 8, wherein said electronic module is for controlling a spa.

14. The mounting assembly as in claim 8, wherein said electronic module is for controlling a pool heater.

15. A mounting assembly for mounting an electronic module to a control panel, wherein said control panel defines a front side and a back side of a control panel wall, comprising:

A. an electronic module body section defining a bracket cutout section,

B. a flange attached to said electronic module body section, and

C. at least one bolt passing through said flange and a portion of said body section, D. at least one L-shaped bracket threadably attached to said at least one bolt and at least partially positioned in said cutout section, wherein the rotation of said at least one bolt is controllable from both said front side of said control panel and from said back side of said control panel, wherein rotation of said bolt causes said L-shaped bracket to be extended outside said cutout section and further rotation of said bolt causes said at least one L-shaped bracket to provide a compressive force holding said electronic module body section in place with said panel wall sandwiched between said flange and said L-shaped bracket.

16. The mounting assembly as in claim 15, wherein said flange is removably attached to said electronic module body section.

17. The mounting assembly as in claim 16, wherein said electronic module body section further defines at least one bolt hole, wherein said back side of said control panel wall comprises at least one rigidly attached bolt, wherein upon removal of said removably attached flange, said electronic module body section is bolted to said back side of said control panel wall by sliding said at least one bolt hole over said at least one rigidly attached bolt.

18. A mounting assembly for mounting an electronic module to a control panel, wherein said control panel defines a front side and a back side and a control panel wall, comprising:

A. an electronic module body section,

B. a flange removably attached to said electronic module body section, and

C. at least one bracket rotatably attached to said flange, wherein the rotation of said at least one bracket is controllable from said front side of said control panel, wherein when said at least one bracket is tightened a compressive force holding said electronic module body section in place is imparted between said flange, said control panel wall and said at least one bracket.

19. The mounting assembly as in claim 18, wherein said electronic module body section further defines at least one bolt hole, wherein said back side of said control panel wall comprises at least one rigidly attached bolt, wherein upon removal of said removably attached flange, said electronic module body section is bolted to said back side of said control panel wall by sliding said at least one bolt hole over said at least one rigidly attached bolt.

20. The mounting assembly as in claim 18, wherein said electronic module body section further defines at least one bolt hole, wherein said back side of said control panel wall comprises at least one rigidly attached bolt, wherein upon removal of said removably attached flange, said electronic module body section is bolted to said back side of said control panel wall by sliding said at least one bolt hole over said at least one rigidly attached bolt.

21. A mounting assembly for mounting an electronic module to a control panel, wherein said control panel defines a front side and a back side and a control panel wall, comprising:

A. an electronic module body section means,

B. a flange means removably attached to said electronic module body section means, and C. at least one bracket means rotatably attached to said flange means, wherein the rotation of said at least one bracket means is controllable from said front side of said control panel, wherein when said at least one bracket means is tightened a compressive force holding said electronic module body section means in place is imparted between said flange means, said control panel wall and said at least one bracket means.

22. The mounting assembly as in claim 21, wherein said electronic module body section means further defines at least one bolt hole means, wherein said back side of said control panel wall comprises at least one rigidly attached bolt means, wherein upon removal of said removably attached flange means, said electronic module body section means is bolted to said back side of said control panel wall by sliding said at least one bolt hole means over said at least one rigidly attached bolt means.

23. The mounting assembly as in claim 21, wherein said electronic module body section means further defines at least one bolt hole means, wherein said back side of said control panel wall comprises at least one rigidly attached bolt means, wherein upon removal of said removably attached flange means, said electronic module body section means is bolted to said back side of said control panel wall by sliding said at least one bolt hole means over said at least one rigidly attached bolt means.

* * * * *